United States Patent [19]

Brandt

[11] Patent Number: 5,556,112
[45] Date of Patent: Sep. 17, 1996

[54] SHAFT SEALING RING WITH FLEXIBLE HINGED SEALING LIP

[75] Inventor: Hans-Jürgen Brandt, Hamburg, Germany

[73] Assignee: Martin Merkel GmbH & Co KG, Hamburg, Germany

[21] Appl. No.: 406,941

[22] PCT Filed: Oct. 5, 1993

[86] PCT No.: PCT/EP93/02720

§ 371 Date: Mar. 29, 1995

§ 102(e) Date: Mar. 29, 1995

[87] PCT Pub. No.: WO94/08160

PCT Pub. Date: Apr. 14, 1994

[30] Foreign Application Priority Data

Oct. 5, 1992 [DE] Germany ................. 92 13 373 U

[51] Int. Cl.$^6$ ........................................ F16J 15/32
[52] U.S. Cl. ............................. 277/152; 277/215
[58] Field of Search ......................... 277/27, 37, 152, 277/215

[56] References Cited

U.S. PATENT DOCUMENTS

| | | |
|---|---|---|
| 4,344,631 | 8/1982 | Winn ............................. 277/27 |
| 4,995,621 | 2/1991 | Devouassoux et al. . |
| 5,411,273 | 5/1995 | Pietsch et al. ................. 277/27 |

FOREIGN PATENT DOCUMENTS

| | | |
|---|---|---|
| 0133928A1 | 3/1985 | European Pat. Off. . |
| 0213998A1 | 3/1987 | European Pat. Off. . |
| 0284496A1 | 9/1988 | European Pat. Off. . |
| 246576 | 10/1988 | Japan ............................. 277/152 |
| 1183418 | 3/1970 | United Kingdom . |
| 1429939 | 3/1976 | United Kingdom ............ 277/152 |
| 1457261 | 12/1976 | United Kingdom ............ 277/152 |
| 2085096 | 4/1982 | United Kingdom ............ 277/152 |
| 2213540 | 8/1989 | United Kingdom ............ 277/152 |

*Primary Examiner*—Scott Cummings
*Attorney, Agent, or Firm*—Chilton, Alix & Van Kirk

[57] ABSTRACT

A shaft sealing ring comprising an annular holder (3) and an annular sealing section consisting of a sealing lip (4) extending to the surface (1) of the shaft against the pressure difference to be sealed and a radially extending connecting section (15) connecting the sealing tip (4) to the holder (3). The sealing tip (4) and the connecting section (15) are dimensioned so that their flexions to be expected under the pressure difference to be sealed exert a contrary affect upon the angle at which the sealing ring (4) is seated on the surface (1) of the shaft. This is made possible by the fact that at least one part (8) of the connection section (15) which is closer to the shaft surface (1) than another part (7) of the connection section (15) is deformed further towards the low-pressure side (PN) under the pressure difference to be sealed than the other part (7) of the connecting section.

9 Claims, 1 Drawing Sheet

SHAFT SEALING RING WITH FLEXIBLE HINGED SEALING LIP

The invention relates to a shaft sealing ring which comprises an annular holder and an annular sealing part which is made up of a sealing lip extending to the surface of the shaft against the pressure difference to be sealed and of an approximately radially extending connecting section which connects the sealing lip to the holder. In the case of a known seal of this kind (EP-A 0 133 928), the connecting section is not of stiffer design than the sealing lip in order to allow it to bend easily. This ensures that the sealing part can be molded as a radial disc and assumes the typical sloping lip orientation against the pressure difference to be sealed only through deformation during installation. It is not known how the known seal deforms under a pressure difference. It must be assumed that, under the pressure difference to be sealed off, the sealing lip, which encloses an acute angle with the surface of the shaft, undergoes a flexure which tends to reduce said angle. It must furthermore be assumed that the sealing part including the connecting section undergoes an axial deformation toward the low-pressure side under the pressure difference to be sealed. Since, as a result, the orientation of the connecting section tends even further towards the radial direction, this deformation too also tends to reduce said angle between the sealing lip and the surface of the shaft. As a result, the known seal is therefore found to undergo a reduction in the angle at which it rests on the surface of the shaft over the pressure range to be sealed. The sealing conditions are thereby changed in a disadvantageous way. This is particularly disadvantageous in the case of a material which, like polytetrafluoroethylene, has a tendency for what is referred to as cold flow. This term denotes that the material is subject to progressive permanent deformation under the prolonged action of force. In the case of the known seal, the reduction in the angle between the sealing lip and the surface of the shaft, particularly under the action of cold flow, leads to a disadvantageous enlargement of the surface by which the lip rests on the surface of the shaft. If the sealing lip is provided with a predetermined cross-sectional geometry so as to form a predetermined contact surface, this geometry is lost as a result of the deformation. At the same time, the sealing pressure rises, the sealing gap becomes smaller and the heat generated therein rises, something which can put the sealing lip at risk since, because of the flexibility or elasticity required, it is generally composed of a material which is sensitive to high temperatures. The loss of the predetermined cross-sectional geometry can furthermore have the effect that the sealing lip no longer rests on the mating sealing surface by the annular surface preformed for this purpose with a particular geometry but then rests on the mating sealing surface only by an edge of this sealing surface, and this can lead to increased frictional stress on and damage to the mating sealing surface.

According to the invention, these disadvantages are reduced or eliminated.

The mode of action of the features of the invention is based on the fact that the lip and the connecting section deform in opposite directions under the pressure difference. In the case of the connecting section, this deformation is distinguished by the fact that at least one part of the connecting section is deformed beyond the radial plane toward the low-pressure side or, in other words, that a part of the connecting section situated radially further in assumes a position nearer to the low-pressure side than a part of the connecting section situated radially further out. This deformation has the effect that the radially inner region of the connecting section not only shifts axially but also slightly outward in the radial direction. This means that that end of the lip which is connected to said connecting section is moved away from the mating sealing surface. The deformation movement of the lip toward the mating sealing surface is thereby counteracted. This results not only in relief of the sealing surface from the force exerted on the lip by the pressure difference but also counteracts the tilting of the tip of the lip.

Given ideal dimensioning, it is in this way possible to ensure that the sealing pressure of the sealing lip and the contact geometry remain constant. This effect is achieved most easily if the connecting section has a minimum length in relation to the axial length of the lip of at least 40%, preferably at least 50%, and furthermore preferably at most 80% and preferably at most 100%.

A deviation of the connecting section or of a substantial part of the latter from the radial direction in the direction of slope of the lip is undesirable because this leads to the function according to the invention only coming into operation when, under a relatively high pressure difference, the connecting section deforms beyond the radial direction toward the low-pressure side whereas the function according to the invention does not take place at a low pressure difference, when the axial deformation of the connecting section is still small. However, there are cases in which this can be tolerated because, in the case of small pressure differences to be sealed, the harmful effects mentioned at the outset are not yet so pronounced. The important thing is that the deformation according to the invention of the connecting section should occur at the predetermined pressure differences at which the disadvantages to be avoided could otherwise occur.

The inventive concept is eminently suitable for lip materials which are relatively rigid such as, for example, polytetrafluoroethylene in its pure form or modified by means of additives, and other polyfluorocarbons. The invention also has the advantage that the cold-flow properties of these materials have little or no effect because these are linked with the occurrence of an unwanted deformation which, however, occurs to only a slight extent by virtue of the invention.

Since, in the context of the invention, the flexure of the lip is undesirable but the deformation of the connecting section is desirable, it is expedient if the connecting section is less rigid than the lip, this being achieved, for example, by making it thinner in its entirety than the lip or having it contain a bending hinge (or a plurality of bending hinges if required). The resistance to bending of the connecting section is expediently no more than half as great as the average resistance to bending in the lip.

The conceptual distinction between the lip and the connecting section does not necessarily mean that the lip and the connecting section have their characteristic stiffness or flexibility over their entire lengths; on the contrary, the transitions may be smooth. Thus, for example, the possibility of the region of the lip nearest the connecting section being thin like the connecting section is not excluded. However, the region of relatively low resistance to bending should account for only a small part of the axial extent of the lip remote from the sealing region, preferably no more than 20% of the total axial extent of the lip. The preferred embodiment is one in which the region of relatively low resistance to bending is almost entirely outside that section of the lip which has an axial component of extension.

The effect of the invention on the sealing behaviour is greater the steeper the angle at which said lip is seated on the mating sealing surface. According to the invention, the angle of the lip to the mating sealing surface should therefore be between 30° and 60°, this angle relating to the connecting line between the root of the lip and the sealing zone of the lip (region of its contact with the mating sealing surface).

It is furthermore expedient, in accordance with the invention, to keep the axial extent of the lip as small as possible since, by this means, it is also possible to reduce the deformation which arises in the sealing zone of the lip. The axial extent of the lip, namely the axial distance between the radially extending transitional section and the sealing zone of the lip, is expediently no greater than 3 mm. According to another dimensioning rule, it should not be greater than 3 times the average thickness of the lip.

The invention is explained in greater detail below with reference to the drawing, which illustrates advantageous exemplary embodiments of the invention. In the drawing.

Figure 1:
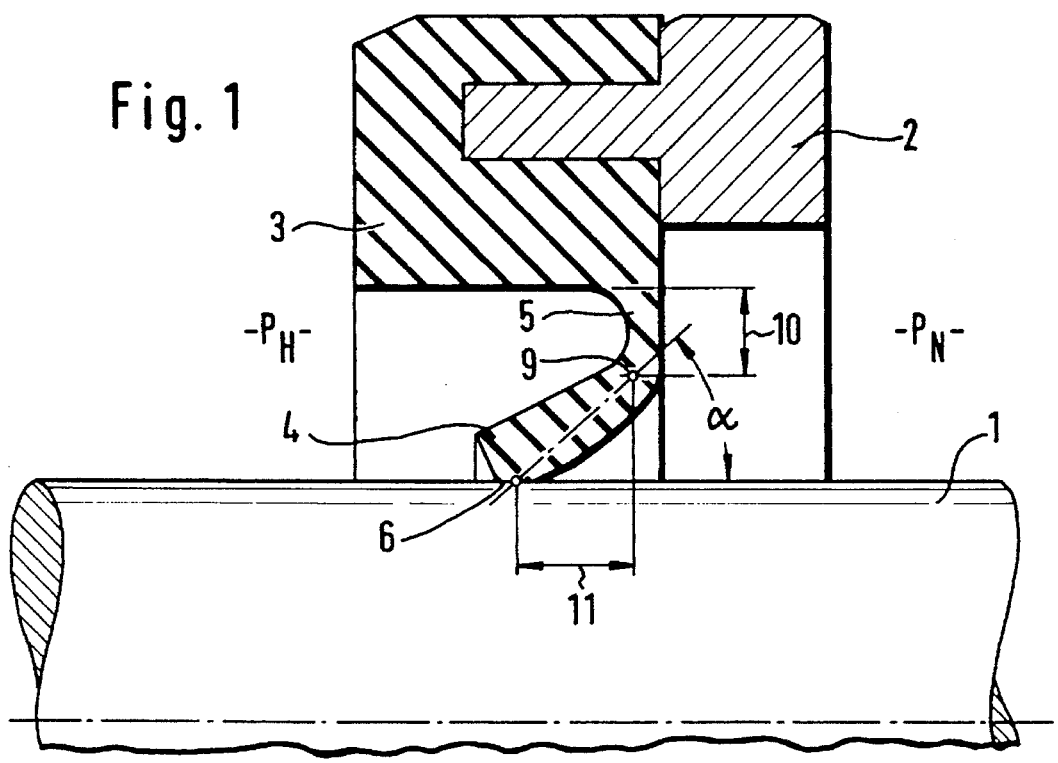
FIG. 1 shows a first embodiment.

The shaft 1 is surrounded by the shaft sealing ring, which is made up of an annular holder 2 made of metal, for example, and of a PTFE part 3, the latter also forming the lip 4 and the connecting section 5 which connects the lip to the holder, these being referred to jointly as the sealing part. This lip 4 rests on the mating sealing surface formed by the shaft by means of the sealing zone 6, preformed with the predetermined contact angle on the lip, over an axial length of approximately 0.3–0.7 mm. The holder is mounted in a housing (not shown).

In the production of the ring, the lip 4 and the connecting section 5 are preferably molded in an approximately radial direction and then bent in the way shown. This bending is promoted by the fact that the connecting section 5 is of flexurally soft design while the lip 4 extending from it to the sealing zone 6 is of flexurally stiff design. The length and thickness conditions are chosen in such a way that an angle $\alpha$ at which the lip is seated on the mating sealing surface of 30°–60° preferably 40°–60° and, in the example illustrated, approximately 45° is established. This angle is measured from the center of the sealing zone 6 to the imaginary point 9 at which the connection between the lip 4 and the connecting region can be imagined to be concentrated in the manner of a hinge. Since the resistance to the bending of the lip derives not only from its thickness but also from its circumferential expansion, this imaginary hinge point is situated not in the center of the connecting section 5 but close to the root of the lip, approximately at point 9. The radial length 10 of the connecting section is about 50–60% of the component 11 of the length of the lip extending in the axial direction.

The lip 4 attains approximately twice the thickness of the connecting section 5, its thickness increasing continuously from the boundary with the connecting section approximately to the center of its longitudinal extent. Its average thickness is about 1.8 times that of the connecting section; its resistance to bending is therefore at least 3 times as great on average.

The axial length 11 of the lip 4 is approximately 1.8 times its average thickness. It should not be greater than 3 times, preferably no greater than 2 times, its average thickness. This is because the shorter the axial length of this section, the smaller are the bending force exerted on it by the differential pressure to be sealed and the change in the angle $\alpha$ to be expected at the free end of the lip.

It has been found that the seal according to the invention is considerably more resistant in the pressure range of a few bar up to about 25 bar than corresponding known constructions.

Figure 2:
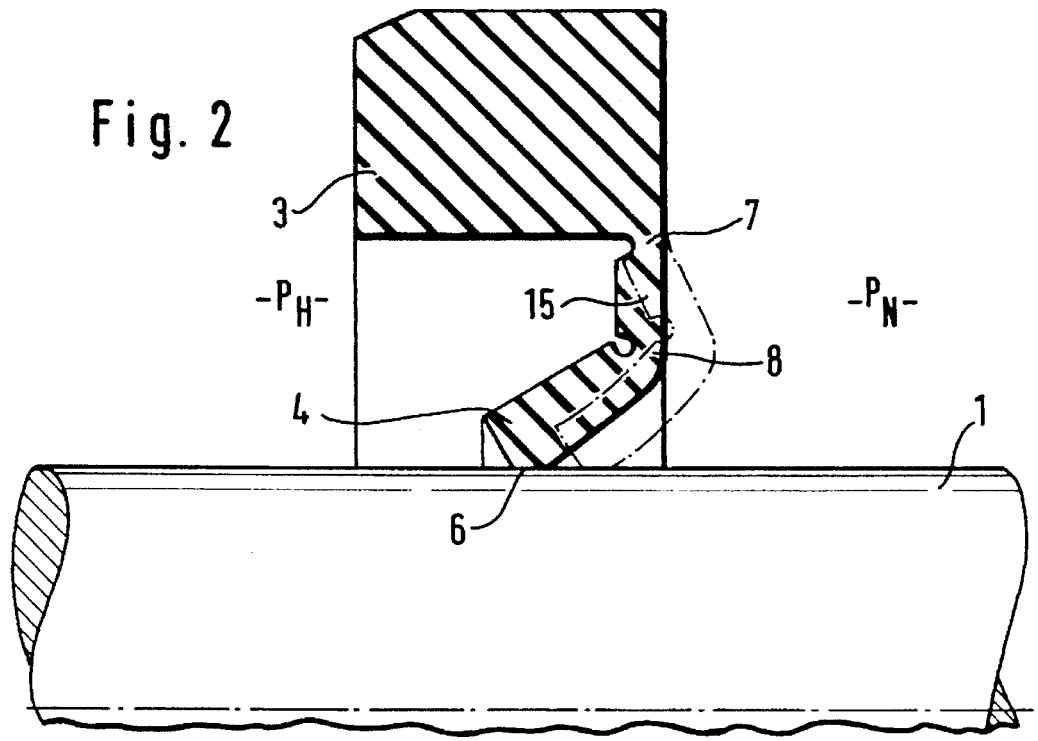
FIG. 2 shows a second embodiment, both in meridional section

The exemplary embodiment in accordance with FIG. 2 differs from that in accordance with FIG. 1 in that the connecting section 15 is not of flexurally soft design throughout but has bending hinges 7, 8 at its upper end, where it is connected to the holding part 3, and at its lower end, where it merges into the lip 4, these hinges being formed by appropriate thinning of the material at these points.

The function of the features according to the invention may be described with reference to this embodiment as follows. When a pressure difference from the side of the higher pressure $P_H$ to the side of the lower pressure $P_N$ acts on the sealing ring, the sealing ring is deformed from the original position shown in solid lines into the deformed position represented by chain-dotted lines. During the deformation, bending hinge 8 moves approximately on a circular path around bending hinge 7, its distance from the mating sealing surface of the shaft 1 increasing slightly in the process. At the end at which it is connected to the connecting section, the lip 4 is thus moved away from the mating sealing surface. This deformation has the effect of relieving the load on its sealing zone 6. The bending of the lip is also counteracted. The bending of the connecting section 15 and the bending of the lip 4 thus have opposite effects on the angle at which the free end of the lip 4 is seated on the shaft 1. These opposing effects can be controlled in such a way by appropriate dimensioning of the lip and of the connecting section that the geometrical conditions under which the sealing zone 6 of the lip rests on the mating sealing surface remain approximately constant.

It is easy to determine by trial and error what length of the lip 4 and of the connecting section 15 and what thicknesses of material lead to the desired results with a given pressure and a given material.

I claim:

1. In a shaft sealing ring mountable on a shaft having a surface with a sealing zone wherein the ring comprises an annular holder (3) and an annular sealing part which is made up of a sealing lip (4) and a substantially radially extending connecting section (5, 15) connecting the sealing lip to the holder, said sealing lip extending toward the surface (1) of the shaft for engagement with the sealing zone and for delineating a pressure difference across the sealing lip from a high-pressure side to a low-pressure side when mounted on said shaft, said sealing lip (4) enclosing an acute angle with the surface (1) of the shaft at the sealing zone and the connecting section (5, 15) undergoing an axial deformation toward the low-pressure side ($P_N$) under the pressure difference to be sealed, the improvement wherein the connecting section (5, 15) is less resistant to bending than the sealing lip (4) and includes first and second radially spaced parts, the first part (8) of the connecting section (5, 15), which lies closer to the surface (1) of the shaft than the second part (7) of the connecting section (5, 15) being deformed further toward the low-pressure side ($P_N$) under a pressure difference to be sealed than the second part (7) of the connecting section, the end of the sealing lip (4) connected to the connecting section being movable axially toward the low-pressure side and radially away from the surface (1) of the shaft under the pressure difference to be sealed to maintain or increase said angle between the sealing lip (4) and the surface of the shaft at the sealing zone.

2. The shaft sealing ring as claimed in claim 1, wherein the radial length (10) of the connecting section (5, 15) is at least 40% of the axial extent (11) of the lip.

3. Shaft sealing ring as claimed in claim 1, wherein the lip (4) is composed of stiff pliable material.

4. The shaft sealing ring as claimed in claim 1, wherein the lip (4) is composed of a material which is subject to the risk of cold flow.

5. The shaft sealing ring as claimed in claim 1, wherein the connecting section (5, 15) forms or contains at least one bending hinge (7, 8).

6. The shaft sealing ring as claimed in claim 1, wherein the resistance to bending in the connecting section (5, 15) is at least half as great as the average resistance to bending at the lip (4).

7. The shaft sealing ring as claimed in claim 1, wherein the lip (4) extends at an angle $\alpha$ of 30° to 60° to the mating sealing surface (1).

8. The shaft sealing ring as claimed in claim 1, wherein the axial extent of the lip is no greater than 3 mm.

9. The shaft sealing ring as claimed in claim 1, wherein the axial extent of the lip is no greater than 3 times the average thickness of the lip (4).

* * * * *